March 19, 1963 H. D. MITCHELL, JR 3,081,860
APPARATUS FOR TRANSFERRING ARTICLES
Filed June 26, 1961 2 Sheets-Sheet 1
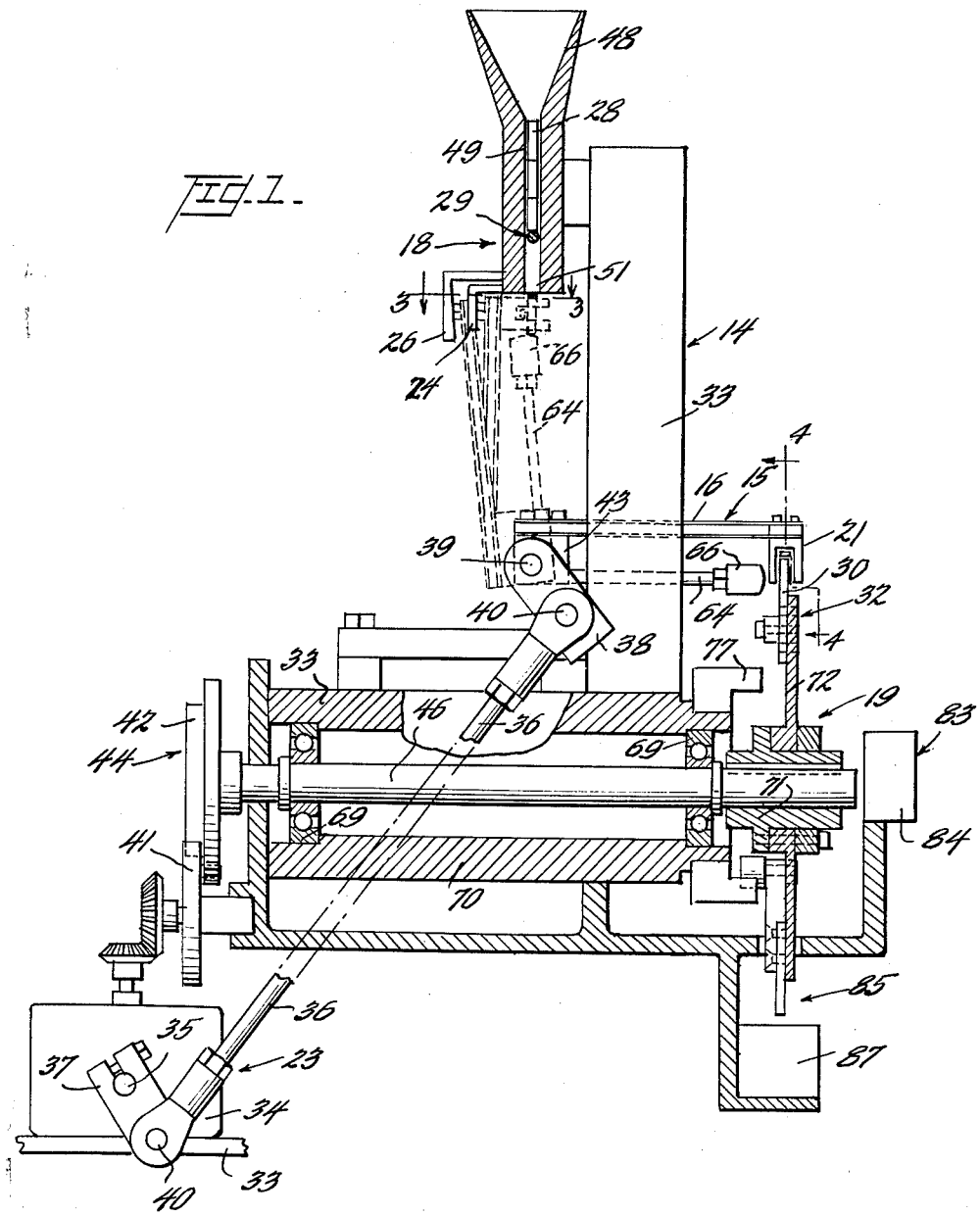
INVENTOR
Henry D. Mitchell, Jr.,
BY R. P. Miller
ATTORNEY

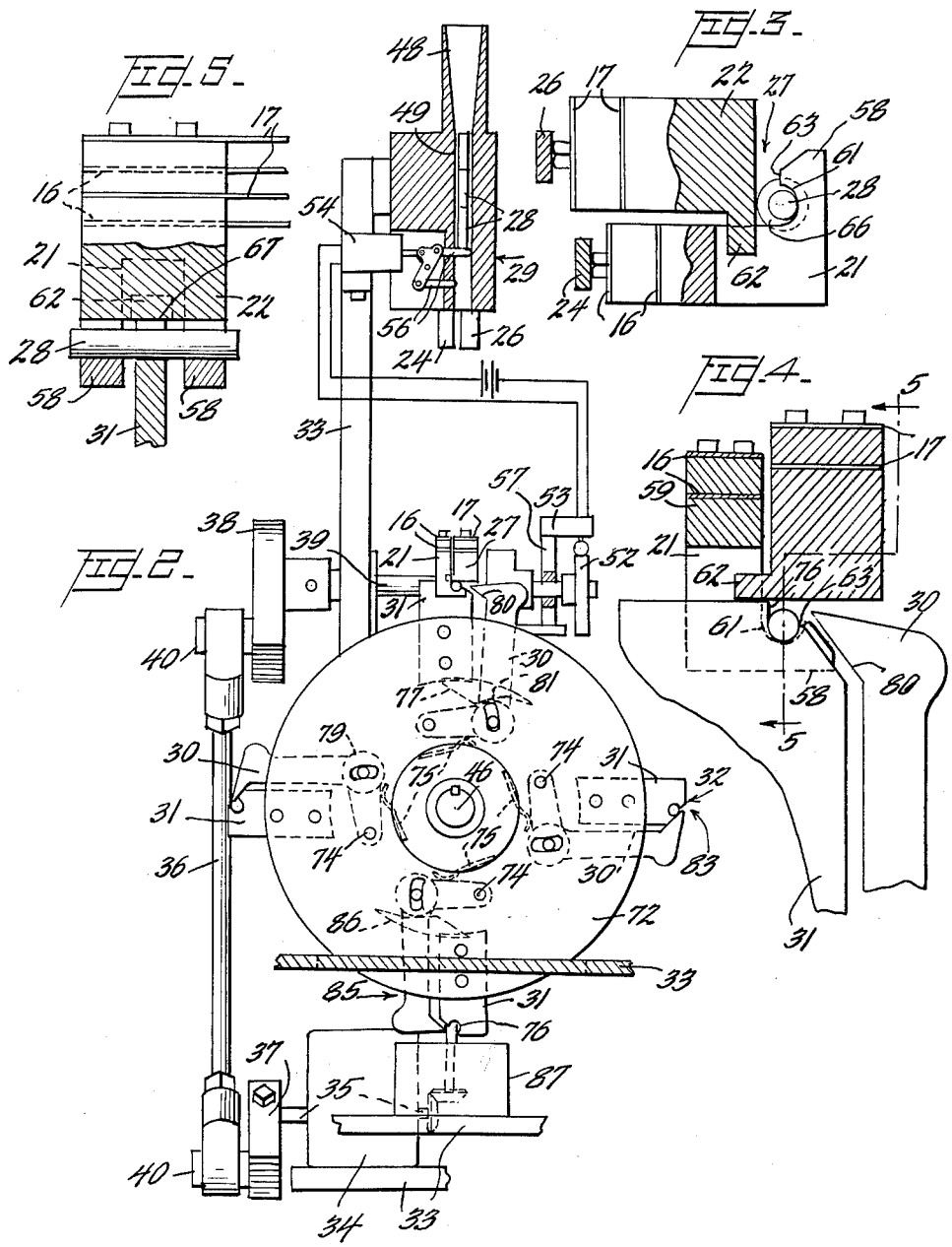

United States Patent Office 3,081,860
Patented Mar. 19, 1963

3,081,860
APPARATUS FOR TRANSFERRING ARTICLES
Henry D. Mitchell, Jr., Winston-Salem, N.C., assignor to Western Electric Company, Incorporated, New York, N.Y., a corporation of New York
Filed June 26, 1961, Ser. No. 119,649
7 Claims. (Cl. 198—27)

This invention relates to apparatus for transferring articles and more particularly to an oscillatory transfer device for advancing articles from an article supply to an article carrier.

In the manufacture of electrical components such as resistors, it is sometimes desirable to load articles into holders mounted on an article carrier. In certain manufacturing operations wherein the articles are large in size and the article carrier indexes slowly, manual operations are suitable for loading the article carrier. However, in other operations such as the manufacture of deposited carbon resistors, the article is so small and the article carrier indexes at such a high speed that manual operations are not feasible.

An object of this invention is to provide new and improved apparatus for transferring articles.

Another object of this invention is to provide an oscillating transfer device including resilient arms for urging together opposed clamping facilities wherein facilities are provided for spreading the clamping facilities to receive and discharge articles.

Still another object of this invention resides in the provision of a drive mechanism for synchronously indexing an article carrier and oscillating an article transfer arm between an article supply and the carrier so that articles are loaded into successive holders mounted on the carrier.

An additional object of this invention resides in the provision of a clamp urged by a leaf spring to hold an article in a bifurcated cradle that is supported on a leaf-spring unit wherein the clamp is advanced into engagement with and stopped by an article carrier so that the article is released and the cradle deposits the article onto the article carrier.

With these and other objects in view, the present invention contemplates a pair of leaf-spring units supported for oscillatory movement between an article supply and an indexing carrier. A first of the leaf-spring units supports a bifurcated cradle and a second of the units supports a clamp. When the leaf-spring units are rotated to position the cradle and clamp beneath the article supply, a stop member arrests movement of the cradle for spreading the cradle and clamp apart to permit an article to advance from the article supply into the cradle. Upon rotation of the leaf-spring units away from the article supply, the first leaf-spring unit urges the clamp toward the cradle to hold the article in the cradle. Further clockwise movement of the leaf-spring units causes the cradle to straddle the indexing carrier and the clamp to engage the carrier. Continued movement of the cradle releases the article which is then deposited in a holder mounted on the indexing carrier. The indexing carrier is then advanced to move the article away from the cradle.

A complete understanding of this invention may be had by reference to the following detailed description when read in conjunction with the accompanying drawings illustrating a preferred embodiment thereof wherein:

FIG. 1 is a front elevational view of a device for transferring articles from an article supply to an indexing carrier showing a pair of leaf-spring units supporting a cradle and an article clamp according to the principles of the invention;

FIG. 2 is a side elevational view of the apparatus disclosed in FIG. 1 showing a drive mechanism for indexing the carrier and oscillating the leaf-spring units between the article supply and the article carrier wherein the drive mechanism actuates an escapement provided in the article supply for feeding an article to the cradle and the clamp;

FIG. 3 is a cross-sectional plan view taken on line 3—3 of FIG. 1 showing stop members for maintaining the cradle and clamp in spaced relationship for receiving an article from the article supply;

FIG. 4 is a cross-sectional view taken on line 4—4 of FIG. 1 showing the clamp in engagement with the article carrier and the cradle straddling the carrier wherein the cradle is spaced from the clamp for depositing an article in a holder mounted on the carrier; and FIG. 5 is a cross-sectional view taken on line 5—5 of FIG. 4 showing an article supported by the cradle prior to being deposited in the holder mounted on the article carrier.

*General Description*

Referring in general to FIG. 1, a transfer device, generally indicated by the reference numeral 14, is shown including a transfer arm 15 which comprises a pair of leaf-spring units 16 and 17 supported for oscillatory movement between an article or resistor core supply 18 and an indexing article carrier or conveyor 19. A first of the leaf-spring units 16 (FIGS. 1 and 2) supports a bifurcated cradle 21 and a second of the units 17 supports a clamp 22. A drive mechanism 23 rotates the leaf-spring units 16 and 17 to move the cradle 21 and the clamp 22 into a position beneath the resistor core supply 18. A first stop member 24 positioned in the arc of movement of the cradle 21 stops the cradle in vertical alignment with the core supply 18. The clamp 22 continues to move and thus moves away from the cradle until it engages and is stopped by a second stop member 26 so that there is a space 27 (FIG. 3) between the cradle 21 and the clamp 22 for receiving a cylindrical article or resistor core 28 from the core supply 18.

An escapement mechanism 29 provided in the core supply 18 is actuated to dispense a resistor core 28 from the core supply 18 into the space 27 (FIG. 3) between the cradle 21 and the clamp 22. The drive mechanism 23 then rotates the leaf-spring units 16 and 17 clockwise away from the core supply 18 whereupon the second leaf-spring unit 17 urges the clamp 22 toward the core 28 for holding the core in the cradle.

Further clockwise movement of the leaf-spring units 16 and 17 advances the clamp 22 into engagement with arms 30 and 31 provided on a core holder 32 that is mounted on the indexing carrier 19. Continued clockwise movement of the leaf-spring units 16 and 17 causes the cradle 21 to straddle the arms 30 and 31 of the indexing carrier 19 which have been indexed by the drive mechanism 23 into alignment with the transfer device 15. The cradle 21 moves clockwise to release the core 28 from the action of the clamp 22 and then deposits the core in the core holder 32 provided on the carrier 19. The drive mechanism 23 then indexes the carrier 19 to advance the deposited core 28 away from the cradle 21 whereupon the cradle and the clamp are rotated counterclockwise toward the article supply 18 to receive the next subsequent core.

*Drive Mechanism*

Referring in detail to FIG. 1, a frame 33 is shown supporting a drive motor 34 which continuously rotates a main drive shaft 35. A crank arm 37 clamped to and rotated by the main drive shaft 35 oscillates a lever 38 through a link 36 that is mounted on stub shafts 40 fixed to the crank arm and the lever. The lever 38 is keyed to and rotates a second shaft 39 that is journalled for rotation on the frame 33. The main drive shaft 35 also drives a pin wheel 41 of a Geneva drive mechanism 44.

Continuous rotation of pin wheel 44 engages and intermittently rotates a star wheel 42 that is keyed to an output shaft 46.

It may be appreciated that continuous rotation of the main drive shaft 35 rotates the crank arm 37 for reciprocating the link 36. Reciprocation of the link 36 oscillates the lever 38 which in turn oscillates the shaft 39 and thus the leaf-spring units 16 and 17 between the core supply 18 and the article carrier 19. One revolution of the main drive shaft 35 advances the leaf-spring units 16 and 17 through one cycle of oscillation whereby the units successively deposit a core on the article carrier 19, receive another core from the core supply 18, and again advance to the article carrier. During this cycle the Geneva mechanism 44 rotates the output shaft 46 through one quarter of a revolution for advancing a loaded core holder 32 away from the leaf-spring units 16 and 17 and for positioning an unloaded core holder 32 in the arc of movement of the leaf-spring units.

*Article Supply*

Still referring to FIG. 1, the core supply 18 is shown including a hopper 48 that is connected to feed resistor cores into a chute 49. The escapement mechanism 29 is interposed between the ends of the chute 49 for regulating the passage of resistor cores 28 from the terminal end 51 of the feed chute 49.

As shown in FIG. 2, a second cam 52 is provided on the second shaft 39 for actuating a microswitch 53 when the cradle 21 and clamp 22 are in the core-receiving position indicated in dotted lines in FIG. 1. Closure of the microswitch 53 energizes a solenoid 54 for reversing the position of the control bars 56 of the escapement mechanism 29, whereupon a single core 28 advances through the terminal end 51 of the chute 49 into the space 27 (FIG. 3) between the cradle and clamp.

*Transfer Arm*

The second drive shaft 39 is journalled in bearing sleeves 57 and drives the supporting block 43. One end of each of the leaf-spring units 16 and 17 is fixed to the supporting block so that the two leaf springs that comprise each leaf-spring unit are held in parallel relationship as shown in FIGS. 1 and 2. The first leaf-spring unit 16 supports the cradle 21 in its free end. Referring to FIGS. 3, 4, and 5, the cradle 21 is including bifurcated fingers 58 which extend downwardly from the main body 59 of the cradle. A generally semi-circular or U-shaped extension or cradle portion 61 is provided on each end of the fingers 58 for supporting a resistor core 28 as shown in FIGS. 3 and 4.

The second leaf-spring unit 17 supports the clamp 22 on its free end. The clamp 22 is provided with a finger 62 that extends between the fingers 58 of the cradle 21 and is normally urged by the combined action of both of the leaf spring units 16 and 17 into engagement with the tips 63 of the fingers. When a resistor core 28 is received in the cradle portion 61, the clamp 22 is urged into engagement with the resistor core 28 which is thus urged against and held in the cradle portion 61. The cradle 21 and the clamp 22 thus holding a resistor core 28 are advanced by the leaf spring units 16 and 17 into engagement with the arms 30 and 31 of the core holder 32 that is mounted on the article carrier 19.

*Article Carrier*

The article carrier 19 includes the output shaft 46 mounted for rotation on ball bearings 69 received in a housing 70. As shown in FIG. 1, a hub 71 is keyed to the right end of the shaft 46 for supporting an annular disk 72. As shown in FIG. 2, the annular disk 72 supports at evenly-spaced intervals four arms 30 mounted for rotation on pins 74. Springs 75 fixed to the hub 71 urge the arms 30 clockwise into engagement with the arms 31 for holding resistor cores 28 in recesses 76 formed in the arms 31.

When the Geneva mechanism 44 indexes the arms 30 and 31 of a core holder 32 into alignment with the path of the cradle 21 and clamp 22, a cam 77 fixed to the housing 70 engages a cam follower 79 that is mounted on each of the arms 30. The cam follower 79 slides on the surface of the cam 77 for rotating the arm 30 counterclockwise on the pin 74 to move a bevelled end 80 of the arm 30 away from the recess 76. The recess 76 is thus exposed for receiving a resistor core 28. After a resistor core is deposited in the recess 76, the Geneva drive 44 indexes the shaft 46 which in turn rotates the disk 72. The disk 72 advances the arms 30 and 31 relative to the stationary housing 70 whereupon the cam follower 79 slides down a surface 81 of the cam 77 under the action of the spring 75. The bevelled end 80 of the arm 30 is thus advanced by the action of the spring 75 into engagement with the resistor core for holding the core in the recess 76. The Geneva drive 44 indexes the resistor core 28 to a position 83 whereupon a device 84 may be actuated to perform a fabricating operation such as forcing terminal caps on the ends of the resistor core. The next subsequent indexing movement of the Geneva drive 44 advances the capped resistor core into position 85 whereupon a second cam 86 actuates the cam follower 79 and the arm 30 in a manner similar to the action of the cam 77 to rotate the arm 30 away from the arm 31. The bevelled end of the arm 30 thereby releases the capped resistor core which drops into a receptacle 87.

The operational cycle of the transfer device 14 commences when the drive mechanism 23 rotates the second shaft 39 counterclockwise to rotate the supporting block 43 and the leaf-spring units 16 and 17 counterclockwise into the core-receiving position beneath the core supply 18. At this time the first stop member 24, which depends from the core supply, engages and stops the cradle 21 (as shown in FIG. 3) in alignment with the bore of the chute 49. Continued counterclockwise movement of the second leaf-spring unit 17 advances the clamp slightly further into engagement with the second stop 26 which stops the clamp 22 so that there is a core-receiving space 27 between the clamp and the cradle. The cam 52 then closes the microswitch 53 which energizes the solenoid 54. The solenoid actuates the escapement mechanism 29 which dispenses a resistor core 28 into the space 27. A rod 64 is mounted to the supporting block 43 parallel to the leaf-spring units 16 and 17 for oscillatory movement therewith. Thus, as shown in FIG. 1, when the cradle 21 and the clamp 22 have been advanced counterclockwise into the above-described position beneath the core supply 18 and a core 28 has advanced into the core-receiving space 27, a stop block 66 provided on the end of the rod 64 positions and supports the resistor core so that the core is centered with respect to the fingers 58 of the cradle 21. The arm 37 then reverses the rotation of the lever 38 and thus the leaf-spring units 16 and 17, whereupon the clamp 21 first advances clockwise out of engagement with the second stop 26. The clamp is then urged by the second leaf-spring unit 17 into engagement with the resistor core 28 that is supported on the stop block 66 within the cradle portion 61. As the lever 38 is further advanced clockwise, the supporting block 43 rotates both of the leaf-spring units 16 and 17 in the same direction, whereupon the resistor core 28 is held between the clamp 22 and the cradle 21 by the cooperative action of the leaf-spring units.

The clamped resistor core 28 is advanced toward the article carrier 19 which has been indexed to position one of the core holders 32 in alignment with the path of the cradle and clamp. The cam 77 has rotated the arm 30 on the pin 74 to expose the recess 76 formed in the arm 31 for receiving the resistor core 28. As shown in FIGS. 3 and 4, the cradle 21 is advanced toward and the fingers 58 thereof straddle the upwardly extending ends of the arms 30 and 31 provided on the article carrier 19. Further advancement of the leaf-spring units 16 and 17 moves the finger 62 of the clamp 22 into engagement with the outer surface 67 (FIG. 5) of the arm 31 for arresting movement of the clamp 22. As the leaf-spring units rotate further clockwise, the cradle 22 further straddles the arm 31 so that the resistor core 28 freely rests on the cradle inasmuch as the clamp 22 has been stopped and the clamping action thereof has been released. Continued movement of the cradle 21 deposits the resistor core 28 onto the bottom of the recess 76 whereupon the cradle advances further clockwise so that the tips 63 of the cradle portions are positioned lower than the resistor core as it rests in the recess 76. The Geneva mechanism 44 then indexes the article carrier 19 whereupon the arm 30 closes for holding the resistor core 28 in the recess 76. The transferred resistor core 28 is then advanced away from the cradle 22 for subsequent manufacture or capping by the manufacturing device 84.

The arm 37 then rotates the lever 38 counterclockwise so that the cradle 21 and the clamp 22 are advanced into position beneath the core supply 18 to commence the next transfer cycle. As the cradle 21 and the clamp 22 advance to the core-receiving position, the second cam 52 reverses the escapement 29 so that the next core advances onto the lower escapement bar 56 for subsequent advancement into the cradle 21. After the next subsequent transfer cycle is completed, the first transferred resistor core 28 is advanced to position 85 in alignment with the receptacle 88 whereupon the cam 86 opens the arm 30 to permit the capped resistor core to drop into the receptacle 87.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a device for transferring an article from an article supply onto an advancing conveyor, cradle means for receiving an article from the article supply, clamp means for holding the article in the cradle means, and oscillating means for advancing the cradle means toward and past the conveyor and advancing the clamp means into stopping engagement with the conveyor to separate the cradle from the clamp and release the article, said cradle means including means for straddling the conveyor to permit the cradle to move past the conveyor and deposit the released article onto the conveyor.

2. In a device for transferring articles from an article supply chute to an advancing article conveyor, means having spaced fingers depending therefrom for carrying an article received from the supply chute, clamp means having a finger extending between said spaced fingers for holding the article in the carrying means, means supporting the carrying means for advancing the fingers thereof to straddle the conveyor, and means for moving the finger of the clamp means into stopping engagement with the conveyor to separate the clamp means from the carrying means to release the article whereby the carrying means deposits the released article onto the conveyor.

3. In a device for transferring an article from a chute onto a conveyor, a first block provided with spaced fingers depending therefrom, each of the fingers formed with a semicircular extension for supporting an article received from the chute, a second block provided with a holding member extending between the spaced fingers, a first resilient unit for carrying the first block, a second resilient unit for urging the second block toward the first block to clamp an article in the extensions, a stop positioned at the terminus of the chute for engaging the fingers to flex and separate the fingers from the holding member whereby an article is advanced from the chute onto the fingers, and means connecting the first and second resilient units for moving the spaced fingers into straddling relationship with the conveyor and for moving the holding member into engagement with the conveyor to flex the second resilient unit to separate the holding member from the spaced fingers to deposit the released article onto the conveyor.

4. In a device for transferring articles from an article supply into recesses provided in an advancing article carrier, leaf-spring units, a cradle mounted on one end of one of the leaf-spring units, a clamp mounted on one end of another of the leaf-spring units and urged thereby against the cradle for holding an article received from the supply in the cradle, means supporting the other ends of the leaf-spring units for moving the units to reciprocate the cradle and clamp between the supply and the carrier, stop means mounted on the article supply for successively stopping the cradle and the clamp to spread the cradle and the clamp apart and form a space therebetween receptive to an article from the supply, means provided on the advancing carrier for stopping the clamp to release an article held thereby against the cradle, said cradle including means for straddling the article carrier to permit the cradle to advance the released article into one of the recesses provided in the carrier.

5. In an article transfer device, a frame, a shaft mounted for rotation on the frame, a first pair of elongated leaf springs mounted on said shaft in spaced parallel relationship for rotation therewith, a cradle member mounted on the first pair of springs, a clamp member, a second pair of elongated leaf springs mounted to the shaft for urging the clamp member against the cradle member, an article supply chute, an article carrier provided with a series of spaced article holders, means for oscillating the shaft to move the cradle and clamp members between the chute and the carrier, stop means mounted on the chute for successively stopping the cradle and then the clamp members to separate the cradle and clamp in alignment with the chute to receive an article from the chute, and means for mounting said article carrier in the path of the clamp member to stop advancement of the clamp member to release an article received in the cradle member, said cradle member having means for straddling the carrier to deposit the released article in an article holder.

6. In a device for transferring an article to a receiver, a pivotally mounted member having a pair of fingers spaced apart a distance greater than the width of the receiver, a resilient arm having a holder for engaging an article positioned on and spanning said fingers, and means for pivoting said member and said arm toward said receiver whereupon the fingers straddle the receiver and the article and holder engage the receiver to flex the resilient arm.

7. A device for transferring articles from a supply source to an article carrier comprising a shaft, a block rotatably mounted about the shaft, a pair of resilient arms extending in a common direction from the block, a cradle member attached to a first arm, a clamping member attached to a second arm opposing the cradle member and resiliently urged against the cradle member, stop means for flexing the cradle member away from the clamping member to allow deposition of an article upon the cradle, means for rotating the cradle and clamping members to position the article on an article carrier, and means on the article carrier for flexing the clamping member away from the cradle member to release the article onto the article carrier.

References Cited in the file of this patent
UNITED STATES PATENTS 662,187  Copenhafer _____ Nov. 20, 1900
1,817,099  Reed _____ Aug. 4, 1931